US012538966B2

(12) United States Patent
Liu (10) Patent No.: US 12,538,966 B2
(45) Date of Patent: Feb. 3, 2026

(54) SUN UMBRELLA LOCKING DEVICE

(71) Applicant: Linhai Guokang Leisure Products Co., Ltd., Zhejiang (CN)

(72) Inventor: Defu Liu, Zhejiang (CN)

(73) Assignee: Linhai Guokang Leisure Products Co., Ltd, Zhejiang (CN)

( * ) Notice: Subject to any disclaimer, the term of this patent is extended or adjusted under 35 U.S.C. 154(b) by 262 days.

(21) Appl. No.: 18/236,807

(22) Filed: Aug. 22, 2023

(65) Prior Publication Data

US 2024/0398078 A1    Dec. 5, 2024

(51) Int. Cl.
    A45B 25/08    (2006.01)
    A45B 19/06    (2006.01)
    A45B 23/00    (2006.01)

(52) U.S. Cl.
    CPC .............. *A45B 25/08* (2013.01); *A45B 19/06* (2013.01); *A45B 2023/0056* (2013.01)

(58) Field of Classification Search
    CPC ......... A45B 19/04; A45B 19/06; A45B 25/08; A45B 25/14; F16B 7/0486; F16B 7/1418
    USPC ............................................ 135/24, 38, 25.4
    See application file for complete search history.

(56) References Cited

U.S. PATENT DOCUMENTS

| | | | | |
|---|---|---|---|---|
| 4,744,690 A * | 5/1988 | Hsieh | .................... | F16B 7/1418 403/104 |
| 4,753,462 A * | 6/1988 | Liu | ..................... | F16D 1/0864 285/424 |
| 5,275,186 A * | 1/1994 | Liu | ........................ | A45B 25/08 135/25.4 |
| 6,155,743 A * | 12/2000 | Chen | ..................... | F16B 7/1418 403/374.1 |
| 6,176,246 B1 * | 1/2001 | Lin | ...................... | A45B 25/143 135/25.1 |
| 8,899,250 B1 * | 12/2014 | Tung | ..................... | A45B 25/14 135/20.1 |
| 2005/0055957 A1 * | 3/2005 | Huang | .................. | A45B 25/08 52/749.1 |
| 2013/0119656 A1 * | 5/2013 | Lee | ....................... | F16B 7/1418 285/308 |
| 2015/0240850 A1 * | 8/2015 | Sato | ...................... | F16B 7/1418 403/104 |
| 2016/0138635 A1 * | 5/2016 | Lai | ........................ | F16B 7/1418 403/377 |

(Continued)

FOREIGN PATENT DOCUMENTS

CN    208491063 U    2/2019

*Primary Examiner* — Daniel J Wiley (57) ABSTRACT

A sun umbrella locking device includes: a sliding base, a locking clamping base and a fastening assembly, wherein a sliding chamber is formed in the locking clamping base, and two locking pieces are arranged on side surfaces of the locking clamping base; an expansion joint is formed between the two locking pieces, and the expansion joint extends into the sliding chamber of the locking clamping base; the two locking pieces are respectively provided with a first locking hole, the sliding base is provided with an accommodating chamber, and the locking clamping base is arranged in the accommodating chamber; the sliding base is provided with a second locking hole aligned with the first locking hole; after passing through the second locking hole and the first locking hole, the fastening assembly is connected to the sliding base and the locking clamping base.

8 Claims, 6 Drawing Sheets

(56) References Cited

U.S. PATENT DOCUMENTS

| | | | | |
|---|---|---|---|---|
| 2016/0201706 | A1* | 7/2016 | Heim | A45B 9/00 |
| | | | | 403/110 |
| 2018/0014522 | A1* | 1/2018 | Bridgewater | A01K 97/06 |
| 2020/0072398 | A1* | 3/2020 | Lin | F16B 7/1418 |
| 2022/0025997 | A1* | 1/2022 | Liao | F16M 11/245 |
| 2022/0151349 | A1* | 5/2022 | Tung | A45B 25/14 |

* cited by examiner

SUN UMBRELLA LOCKING DEVICE

TECHNICAL FIELD

This invention generally relates to the technical field of sun umbrellas, and more particularly, to a sun umbrella locking device.

BACKGROUND

A sun umbrella is a device for people to protect themselves from the sun, which is often used in a courtyard or a public place. Along with the improvement of people's living standards, sun umbrellas have become increasingly popular, providing people with comfortable shades. The handle shell of a conventional side-edge-mounted sun umbrella is typically positioned by means of a positioning hole, a rack or an umbrella rope.

For example, Chinese patent CN208491063U discloses a sun umbrella locking device, comprising an umbrella handle, a fixing sleeve, a folding support, a locking member, a sliding sleeve and umbrella ribs, which are fixed by means of bolt members for adjusting the relative position between the umbrella handle and the sliding sleeve, thereby adjusting the radius of unfolded umbrella ribs, the unfolding and folding of the umbrella ribs.

In the prior art, when the locking device is damaged, it needs to be entirely replaced, resulting in difficult replacement and huge waste.

SUMMARY

The purpose of the present invention is to provide a detachable, easy-to-replace and low-cost sun umbrella locking device.

To achieve the above purpose, the present invention adopts the following technical solution: a sun umbrella locking device comprising a sliding base, a locking clamping base and a fastening assembly, wherein a sliding chamber is formed in the locking clamping base, and two locking pieces are arranged on side surfaces of the locking clamping base, wherein an expansion joint is formed between the two locking pieces, and the expansion joint extends into the sliding chamber of the locking clamping base, wherein the two locking pieces are respectively provided with a first locking hole, the sliding base is provided with an accommodating chamber, and the locking clamping base is arranged in the accommodating chamber, wherein the sliding base is provided with a second locking hole aligned with the first locking hole, wherein after passing through the second locking hole and the first locking hole, the fastening assembly is connected to the sliding base and the locking clamping base.

In another embodiment of the present invention, a fixing ring is arranged at the top portion of the locking clamping base.

In another embodiment of the present invention, a side of the fixing ring facing the locking piece is provided with a water blocking piece, and the water blocking piece is arranged above the locking piece.

In another embodiment of the present invention, a transverse groove extending transversely is provided at a position where the locking clamping base and the fixing ring are connected, the transverse groove extends to an outer side of the locking piece, and the transverse groove is in communication with the expansion joint.

In another embodiment of the present invention, a first compression spring is arranged between the two locking pieces.

In another embodiment of the present invention, a handle is arranged on the sliding base.

In another embodiment of the present invention, the fastening assembly comprises a knob, a coach bolt and a screw, wherein after passing through the second locking hole and the first locking hole, the coach bolt is in threaded connection with the knob. An end portion of the coach bolt is provided with an inner threaded hole, the screw passes through the knob and is in threaded connection with the inner threaded hole of the coach bolt, and a second compression spring and a washer are arranged between the screw and the knob.

In another embodiment of the present invention, the knob is provided with a groove. The second compression spring, the washer and a head portion of the screw are located in the groove, and the opening of the groove in the knob is provided with a blocking cover.

In another embodiment of the present invention, the fastening assembly comprises a knob and a nut, wherein one end of the knob is provided with a screw rod, and the screw rod passes through the second locking hole and the first locking hole to be in threaded connection with the nut. An end portion of the screw rod is provided with a snap spring.

In another embodiment of the present invention, the knob is provided with a groove, and the opening of the groove in the knob is provided with a blocking cover.

Compared with the prior art, the present invention has the following advantages: the sliding base, the locking clamping base and the fastening assembly are independent parts. When one of the parts is damaged, it may be independently replaced. These parts may be made of plastic, achieving a low cost.

Marking Instructions of the Drawings: 1—Locking Device, 2—Vertical Rod, 3—Folding Support, 4—Handle, 5. Locking Clamping Base, 51—Locking Piece, 511—The First Locking Hole, 52—Fixing Ring, 521—Water Blocking Piece, 53—Transverse Groove, 54—Sliding Chamber, 55—The First Compression Spring, 6—Sliding Base, 61—Connecting Lug, 611—The Second Locking Hole, 65—Accommodating Chamber, 7—Fastening Assembly, 71—Coach Bolt, 72—Knob, 721—Groove, 73—The Second Compression Spring, 74—Washer, 75—Screw, 76—Blocking Cover, 77—Screw Rod, 78—Snap Spring, 79—Nut.

DETAILED DESCRIPTION

Referring to FIGS. 1-6, the sun umbrella locking device in embodiments of the present invention is further illustrated.

In the description of the present invention, it should be understood that the orientations or positions indicated by the terms "central", "transverse (X)", "longitudinal (Y)", "perpendicular (Z)", "length", "width", "thickness", "upper", "lower", "front", "rear", "left", "right", "vertical", "horizontal", "top", "bottom", "inner", "outer", "clockwise" and "counterclockwise" are based on the orientations or positions shown in the figures, or the orientations or positions that the product of the present invention is commonly placed during use, or the orientations or positions that are commonly understood by those skilled in the art. They are merely for the convenience of describing and simplifying the description of the present invention, but not indicating or implying that the equipment or element referred to must have a specific orientation, or be constructed and operated in a specific orientation. Thus, they cannot be understood as a limitation of the present invention.

In addition, the terms "first" and "second" are used for descriptive purposes only and cannot be understood as the indication or implication of relative importance or the implication of the number of indicated technical features. Thus, a technical feature defined as "first" or "second" may explicitly or implicitly comprises one or more technical features. In the description of the present invention, unless it is clearly stated, "a plurality of" means two or more.

Embodiment 1

The sun umbrella locking device comprises a sliding base 6, a locking clamping base 5 and a fastening assembly 7, wherein a sliding chamber 54 is formed in the locking clamping base 5, and two locking pieces 51 are arranged on side surfaces of the locking clamping base 5. An expansion joint is formed between the two locking pieces 51, and the expansion joint extends into the sliding chamber 54 of the locking clamping base 5. The two locking pieces 51 are respectively provided with a first locking hole 511, the sliding base 6 is provided with an accommodating chamber 65, and the locking clamping base 5 is arranged in the accommodating chamber 65. The sliding base 6 is provided with a second locking hole 611 aligned with the first locking hole 511. After passing through the second locking hole 611 and the first locking hole 511, the fastening assembly 7 is connected to the sliding base 6 and the locking clamping base 5.

Figure 1:
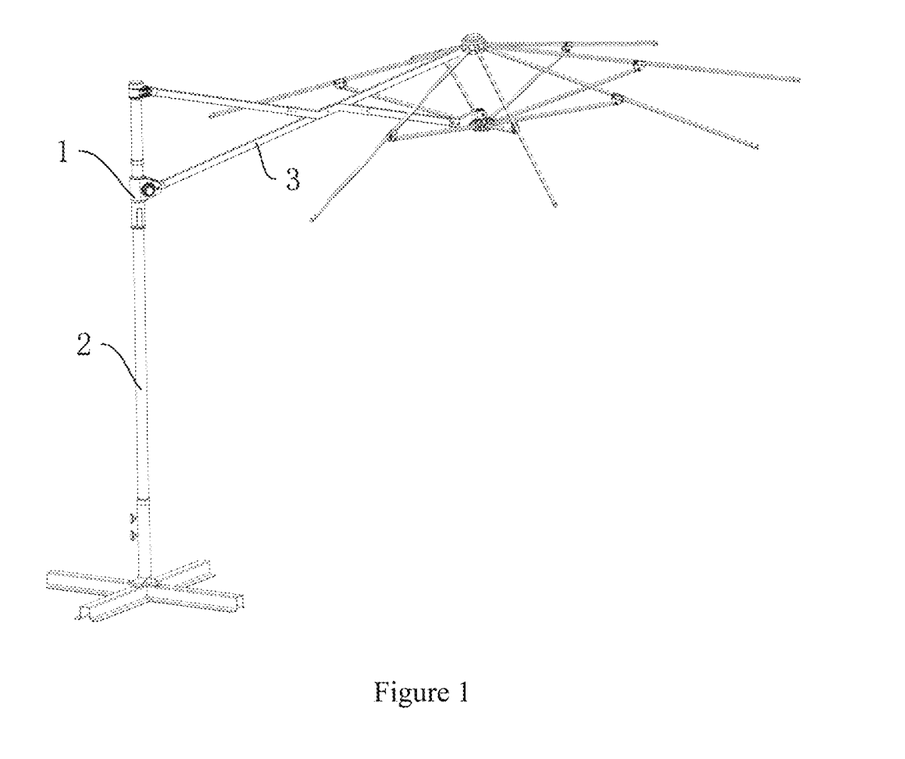
FIG. 1 is a schematic diagram illustrating a state when the sun umbrella is unfolded.
Figure 2:
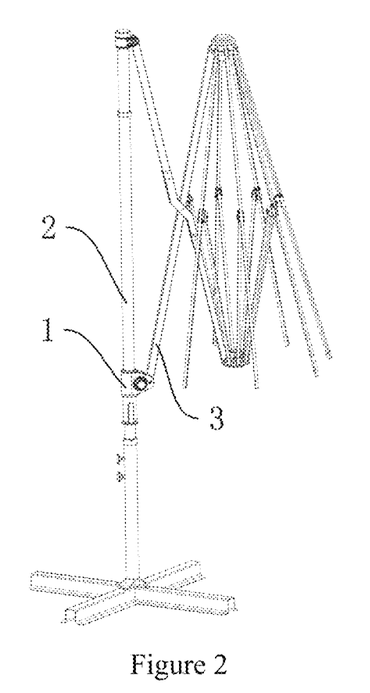
FIG. 2 is a schematic diagram illustrating a state when the sun umbrella is folded.

Referring to FIGS. 1 and 2, in this embodiment, the locking device 1 is used for connecting a folding support 3 of the sun umbrella, wherein a side surface of the sliding base 6 is provided with a connecting lug 61 for being hinged to the folding support 3. The locking device 1 is entirely sleeved on a vertical rod 2, and when the fastening assembly 7 is loosened, the locking device 1 is capable of entirely sliding up and down along the vertical rod 2, thereby achieving the opening and closing the folding support 3.

Figure 3:
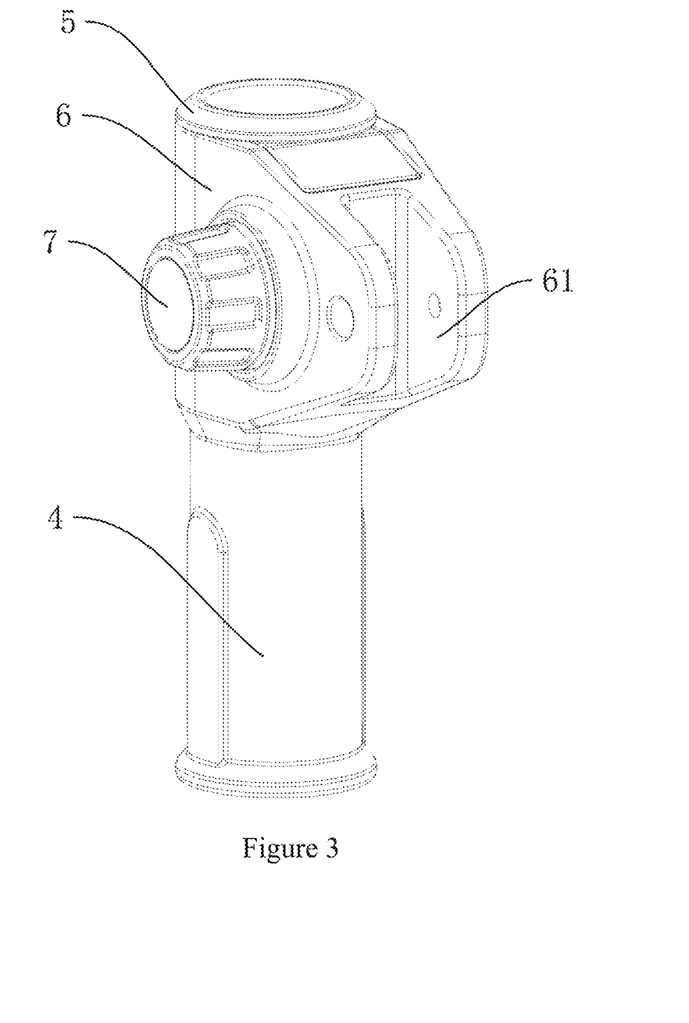
FIG. 3 is a schematic diagram illustrating a three-dimensional structure of the sun umbrella locking device of the present invention.

Referring to FIG. 3, the sliding base 6 is capable of being conveniently manually controlled, and preferably, a handle 4 is arranged on the sliding base 6.

Referring to FIGS. 1-5, in this embodiment, when the vertical rod 2 is configured to be cylindrical, the sliding chamber 54 of the locking clamping base 5 is configured to be cylindrical as well, and the handle 4 also possesses a cylindrical structure. Alternatively, the shape of the sliding chamber 54 of the locking clamping base 5 is the same as the shape of an outer surface of the vertical rod 2. Through adopting this design, the vertical rod 2 is enclosed by the sliding chamber 54.

In this embodiment, preferably, the expansion joint penetrates through an upper end and a lower end of the locking clamping base 5 in the axial direction, and the two locking pieces 51 are squeezed by the fastening assembly 7, so that the contraction of the expansion joint is realized. Namely, the locking clamping base 5 holds a vertical column, and the locking device 1 is integrally fixed to the vertical column. Contrarily, after the two locking pieces 51 are loosened by the fastening assembly 7, the expansion joint expands, and the locking device 1 is capable of being entirely moved by the sliding base 6.

Figure 4:
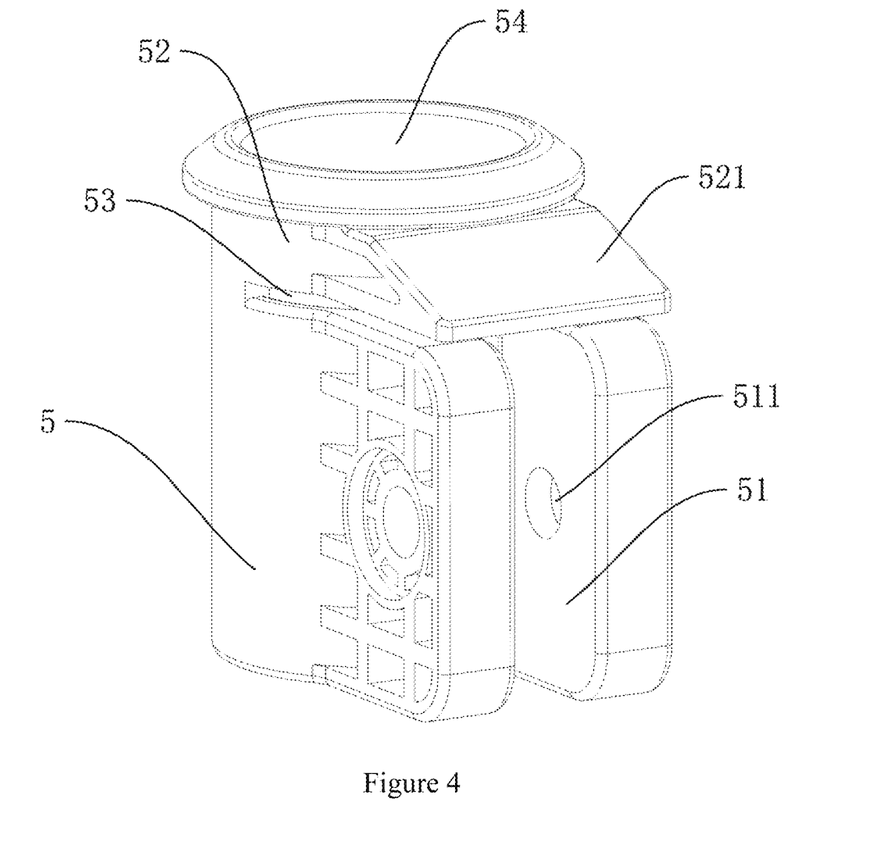
FIG. 4 is a schematic diagram illustrating a three-dimensional structure of the locking clamping base of the present invention.

Referring to FIG. 4, in this embodiment, preferably, a fixing ring 52 is arranged at the top portion of the locking clamping base 5.

In addition, a side of the fixing ring 52 facing the locking piece 51 is provided with a water blocking piece 521, and the water blocking piece 521 is arranged above the locking piece 51. To accommodate the locking clamping base 5, the size and shape of the accommodating chamber 65 formed in the sliding base 6 are the same as those of the locking clamping base 5. After the locking clamping base 5 is placed in the accommodating chamber 65, the water blocking piece 521 is located above the accommodating chamber 65 to shield the two locking pieces 51 and the accommodating chamber 65, thereby preventing rainwater from entering the expansion joint.

Referring to FIG. 4, in this embodiment, preferably, a transverse groove 53 extending transversely is provided at a position where the locking clamping base 5 and the fixing ring 52 are connected, the transverse groove 53 extends to an outer side of the locking piece 51, and the transverse groove 53 is in communication with the expansion joint.

The arrangement of the transverse groove 53 enables the locking clamping base 5 to effectively expand when the two locking pieces 51 are stressed or not stressed, namely, ensuring that the expansion joint possesses enough telescopic ability.

In this embodiment, preferably, a first compression spring 55 is arranged between the two locking pieces 51.

When the fastening assembly 7 is loosened, the first compression spring 55 enables the two locking pieces 51 to extend outwards, thereby increasing the width of the expansion joint such that the locking device 1 is allowed to slide smoothly along the vertical rod 2.

Figure 5:
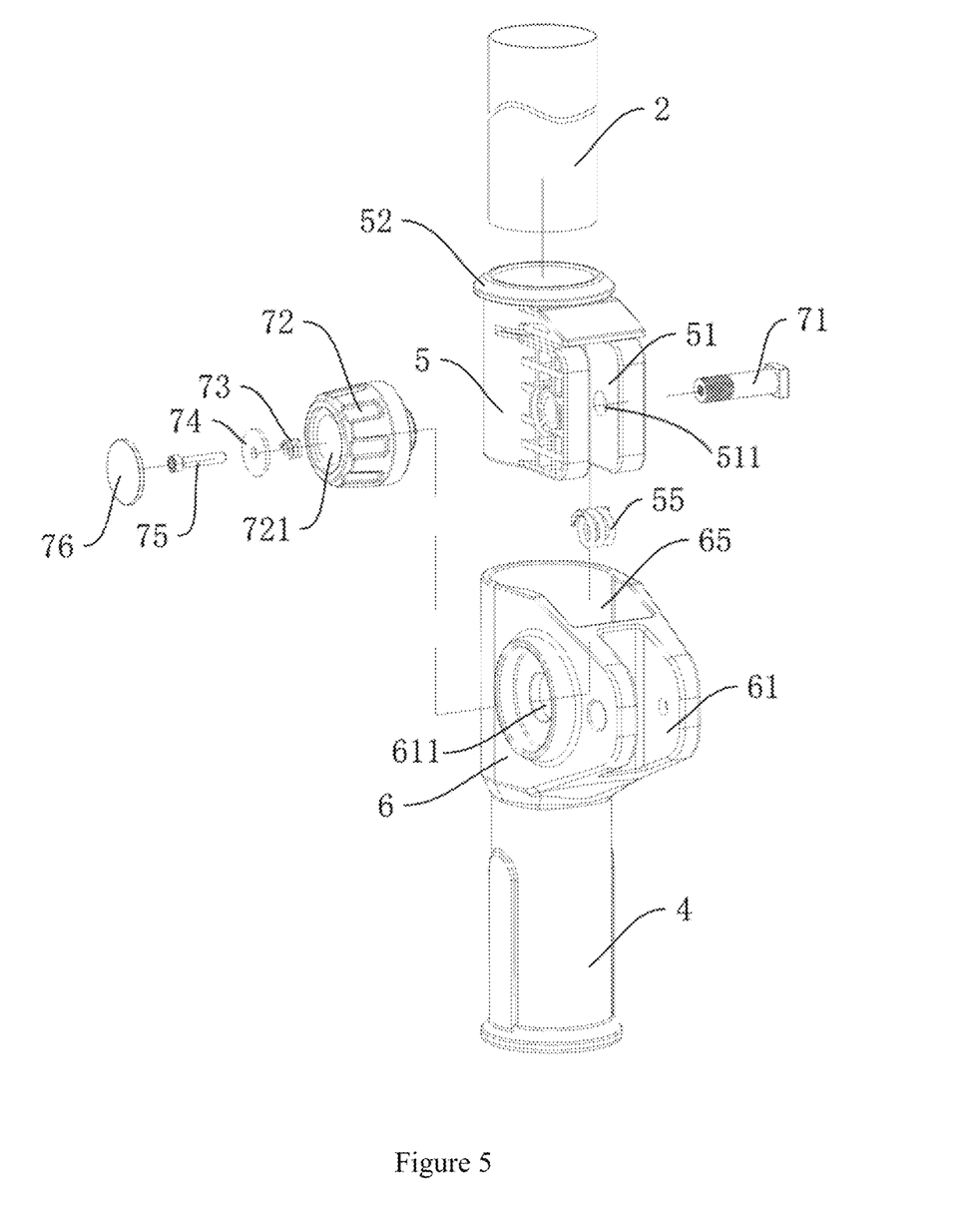
FIG. 5 is a schematic diagram illustrating an explosive view of embodiment 1 of the present invention.

Referring to FIG. 5, in this embodiment, preferably, the fastening assembly 7 comprises a knob 72, a coach bolt 71 and a screw 75, wherein after passing through the second locking hole 611 and the first locking hole 511, the coach bolt 71 is in threaded connection with the knob 72. An end portion of the coach bolt 71 is provided with an inner threaded hole, the screw 75 passes through the knob 72 and is in threaded connection with the inner threaded hole of the coach bolt 71, and a second compression spring 73 and a washer 74 are arranged between the screw 75 and the knob 72.

Through the locking structure between the screw 75 and the coach bolt 71, the knob 72 is mounted on the sliding base 6, wherein the coach bolt 71 and the sliding base 6 are circumferentially fixed to each other through a square neck. When the knob 72 rotates, the knob 72 is close to or away from one side of the square neck of the coach bolt 71 through the threads of the coach bolt 71, thereby achieving fastening or loosening of the two locking pieces 51. During the moving process of the knob 72, the second compression spring 73 ensures that the knob 72 and the locking device 1 are integrally kept tight.

Preferably, the knob 72 is provided with a groove 721. The second compression spring 73, the washer 74 and a head portion of the screw 75 are located in the groove 721, and the opening of the groove 721 in the knob 72 is provided with a blocking cover 76.

Embodiment 2

Figure 6:
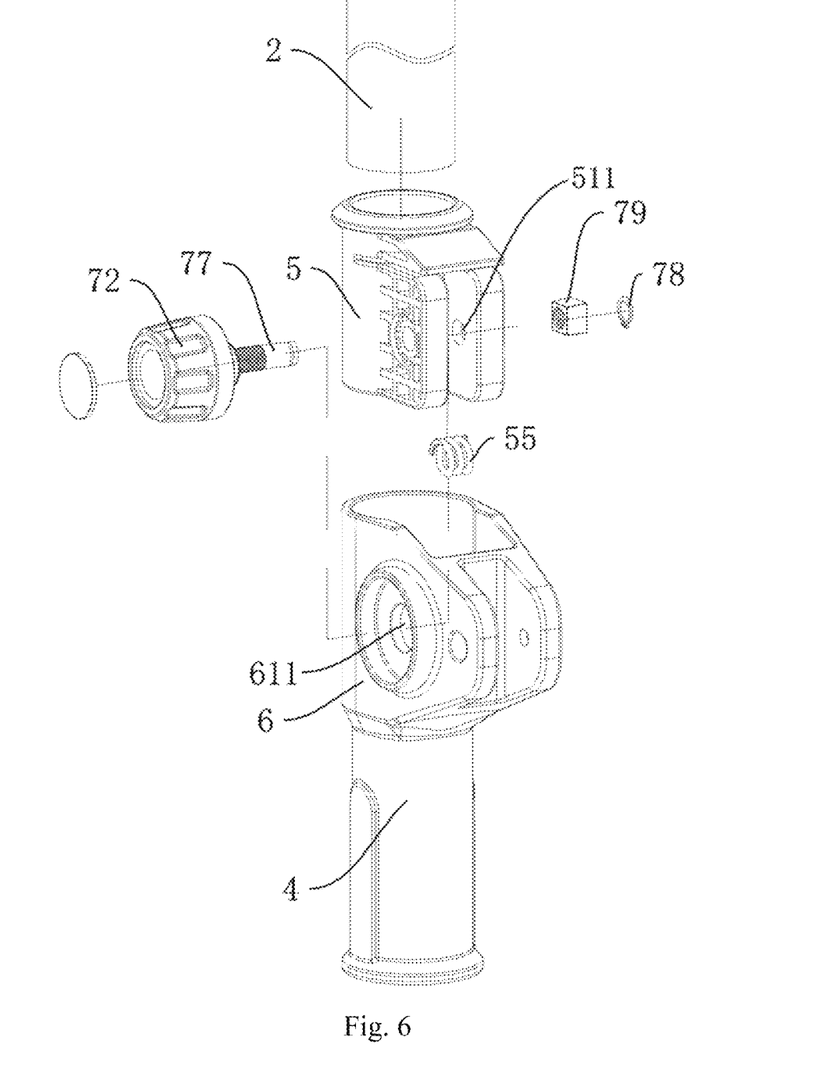
FIG. 6 is a schematic diagram illustrating an explosive view of embodiment 2 of the present invention.

Referring to FIG. 6, the fastening assembly 7 comprises a knob 72 and a nut 79, wherein one end of the knob 72 is provided with a screw rod 77, and the screw rod 77 passes through the second locking hole 611 and the first locking hole 511 to be in threaded connection with the nut 79. An end portion of the screw rod 77 is provided with a snap spring 78. In this embodiment, except for the design of the fastening assembly 7, other technical features in embodiment 2 are the same as those in embodiment 1.

In the present embodiment, the two locking pieces 51 are fastened or loosened by directly rotating the knob 72, wherein the nut 79 is embedded and clamped on the sliding base 6 to prevent the nut 79 from rotating freely, and through the arrangement of the snap spring 78, the screw rod 77 is prevented from being completely separated from the nut 79. Therefore, a simple structure of the present invention is achieved.

The above are merely preferred embodiments of the present invention, and the scope of the present invention is not limited to the embodiments described above. All technical solutions obtained under the idea of the present invention shall fall into the scope of the present invention. It should be noted that various improvements and modifications may be made by those skilled in the art without departing from the principles of the present invention. Therefore, these improvements and modifications shall also fall into the scope of the present invention.

What is claimed is:

1. A sun umbrella locking device, comprising:
   a sliding base,
   a locking clamping base, and
   a fastening assembly, wherein a sliding chamber is formed in the locking clamping base, and two locking pieces are arranged on side surfaces of the locking clamping base, wherein an expansion joint is formed between the two locking pieces, and the expansion joint extends into the sliding chamber of the locking clamping base,
   wherein the two locking pieces are respectively provided with a first locking hole, the sliding base is provided with an accommodating chamber, and the locking clamping base and the two locking pieces are arranged in the accommodating chamber,
   wherein the sliding base is provided with a second locking hole aligned with the first locking hole, wherein after passing through the second locking hole and the first locking hole, the fastening assembly is connected to the sliding base and the locking clamping base,
   wherein a fixing ring is arranged at a top portion of the locking clamping base,
   wherein a transverse groove extending transversely is provided at a position where the locking clamping base and the fixing ring are connected, the transverse groove extends to an outer side of the locking piece, and the transverse groove is in communication with the expansion joint.

2. The sun umbrella locking device of claim 1, wherein a side of the fixing ring facing the locking piece is provided with a water blocking piece, and the water blocking piece is arranged above the locking piece.

3. The sun umbrella locking device of claim 1, wherein a first compression spring is arranged between the two locking pieces.

4. The sun umbrella locking device of claim 3, wherein a handle is arranged on the sliding base.

5. The sun umbrella locking device of claim 1, wherein the fastening assembly further comprises a knob, a coach bolt and a screw, wherein after passing through the second locking hole and the first locking hole, the coach bolt is in threaded connection with the knob, wherein an end portion of the coach bolt is provided with an inner threaded hole, the screw passes through the knob and is in threaded connection with the inner threaded hole of the coach bolt, and a second compression spring and a washer are arranged between the screw and the knob.

6. The sun umbrella locking device of claim 5, wherein the knob is provided with a groove, wherein the second compression spring, the washer and a head portion of the screw are located in the groove, and the opening of the groove in the knob is provided with a blocking cover.

7. The sun umbrella locking device of claim 1, wherein the fastening assembly further comprises a knob and a nut, wherein one end of the knob is provided with a screw rod, and the screw rod passes through the second locking hole and the first locking hole to be in threaded connection with the nut, wherein an end portion of the screw rod is provided with a snap spring.

8. The sun umbrella locking device of claim 7, wherein the knob is provided with a groove, and the opening of the groove in the knob is provided with a blocking cover.

\* \* \* \* \*